(12) United States Patent
Mahoney

(10) Patent No.: US 10,167,654 B2
(45) Date of Patent: Jan. 1, 2019

(54) DOORKNOB INDICATING SYSTEM

(71) Applicant: Cory Mahoney, Calgary (CA)

(72) Inventor: Cory Mahoney, Calgary (CA)

(*) Notice: Subject to any disclaimer, the term of this patent is extended or adjusted under 35 U.S.C. 154(b) by 0 days.

(21) Appl. No.: 15/147,348

(22) Filed: May 5, 2016

(65) Prior Publication Data

US 2016/0333606 A1  Nov. 17, 2016

Related U.S. Application Data

(60) Provisional application No. 62/159,469, filed on May 11, 2015.

(51) Int. Cl.

| E05B 17/10 | (2006.01) |
| E05B 15/02 | (2006.01) |
| E05B 43/00 | (2006.01) |
| E05B 47/00 | (2006.01) |
| E05B 65/00 | (2006.01) |
| F24F 11/77 | (2018.01) |

(52) U.S. Cl.
CPC ............ E05B 17/10 (2013.01); E05B 15/02 (2013.01); E05B 43/005 (2013.01); E05B 47/0001 (2013.01); E05B 65/0035 (2013.01); F24F 11/77 (2018.01); Y02B 30/746 (2013.01)

(58) Field of Classification Search
CPC .... E05B 17/10; E05B 43/005; E05B 47/0001; E05B 15/02; E05B 65/0035; E03D 9/052
See application file for complete search history.

(56) References Cited

U.S. PATENT DOCUMENTS

| 4,683,741 | A | * | 8/1987 | Fields ................ E05B 17/10 109/38 |
| 5,841,361 | A | * | 11/1998 | Hoffman ............ E05B 47/00 340/5.54 |
| 6,622,537 | B2 | | 9/2003 | Rodriguez |
| 7,248,163 | B2 | | 7/2007 | Wu |
| 7,866,195 | B2 | | 1/2011 | Levine |
| 8,141,296 | B2 | | 3/2012 | Bem |
| 8,870,247 | B2 | | 10/2014 | Yamagata et al. |
| 2004/0080932 | A1 | * | 4/2004 | Hata ................. F21S 9/02 362/184 |
| 2006/0227000 | A1 | | 10/2006 | Wu |
| 2014/0131459 | A1 | * | 5/2014 | Dorendorf ......... F24F 11/0079 236/49.3 |

(Continued)

OTHER PUBLICATIONS

BORAT: Bathroom Occupancy Remote Awareness Technology with Arduino, Konstantin Gredeskoul, Oct. 12, 2014, http://kig.re/2014/10/12/borat-bathroom-occupancy-wireless-detection-and-notification-with-arduino.html, last visited Mar. 16, 2017.*

(Continued)

*Primary Examiner* — Erin M File

(57) ABSTRACT

A doorknob indicating system includes an exterior doorknob disposed on an interior side of a door, an interior doorknob disposed on an exterior side of the door, an LED on an escutcheon of said exterior doorknob, a user interface on an escutcheon of said interior doorknob, a source of electrical power, and a controller. The LED, the user interface, and the source of electrical power are operatively connected to the controller. The controller is programmed to illuminate the LED for one or more determined time intervals based upon an input received by the user interface.

3 Claims, 5 Drawing Sheets

(56) References Cited

U.S. PATENT DOCUMENTS

2014/0353980 A1 12/2014 Beck
2016/0317690 A1* 11/2016 Dayton .................... A61L 2/26

OTHER PUBLICATIONS

Wireless RC LED "Bathroom occupied" indicator Electrical Engineering Stack Exchange, May 28, 2014, http://electronics.stackexchange.com/questions/112183/rc-led-bathroom-occupied-indicator, last visited Mar. 16, 2017.*

* cited by examiner

DOORKNOB INDICATING SYSTEM

CROSS-REFERENCE TO RELATED APPLICATIONS

This application claims the benefit of U.S. Provisional Application No. 62/159,469, filed May 11, 2015, the entirety of which is incorporated herein by reference.

FIELD OF THE INVENTION

The present invention relates generally to doorknobs, and more particularly, relating to a doorknob system that indicates status of a room for a selected time interval.

BACKGROUND OF THE INVENTION

There exist doorknob or door lock status indicators. Examples of such prior devices are described by U.S. Pat. No. 4,683,741 and U.S. Published Application Number 2006/0227000, the entirety of each is incorporated herein by reference. While the devices heretofore fulfill their respects objectives, there exists a need for a new doorknob indicating system.

SUMMARY OF THE INVENTION

A primary object of embodiments of the invention is to provide a doorknob indicating system that provides a visual indication of a status of a restroom, bedroom or other room.

Another object of embodiments of the invention is to provide a doorknob indicating system that provides a visual indication of an immediate prior use of a restroom by illuminating a light for a set period of time in order to allow dissipation or removal of unpleasant odor before entering the restroom.

Another object of embodiments of the invention is provide a doorknob indicating system that provides visual indication of the status of a restroom and wireless operates an exhaust fan during the visual status period.

Another object of embodiments of the invention is to provide a doorknob indicating system that automatically locks and unlocks the door lock during the period of indicating status.

Another object of embodiments of the invention is to provide a doorknob indicating system that provides visual indication of the status of a room for a period of time where the occupant of the room desires privacy.

In general, in one aspect, a doorknob indicating system for visually indicating a status of a room is provided. The doorknob indicating system includes an exterior doorknob disposed on an exterior side of a door, an interior doorknob disposed on an interior side of the door, an LED on an escutcheon of said exterior doorknob, a user interface on an escutcheon of said interior doorknob, a source of electrical power, and a controller. The LED, the user interface, and the source of electrical power are operatively connected to the controller. The controller is programmed to illuminate the LED for one or more determined time intervals based upon an input received by the user interface.

In general, in another aspect, a doorknob indicating system for visually indicating a status of a room is provided. The doorknob indicating system includes an exterior doorknob disposed on an exterior side of a door, an interior doorknob disposed on an interior side of the door, an LED on an escutcheon of said exterior doorknob, a user interface on an escutcheon of said interior doorknob, a first source of electrical power, a first wireless transceiver, and a first controller. The LED, the user interface, the source of electrical power, and the first wireless transceiver are operatively connected to the first controller. The system also includes an exhaust fan having a motor, a second source of electrical power, a second wireless transceiver, and a second controller. The motor, the second source of electrical power, and the second wireless transceiver are operatively connected to the second controller. The first controller is programmed to illuminate the LED for one or more determined time intervals based upon an input received by the user interface. The first controller further operating to send a wireless signal via the first wireless transceiver to the second controller via the second wireless transceiver to turn the motor on at the start of a time interval and then again to turn the fan motor off when the time interval expires.

There has thus been outlined, rather broadly, the more important features of the invention in order that the detailed description thereof that follows may be better understood and in order that the present contribution to the art may be better appreciated.

Numerous objects, features and advantages of the present invention will be readily apparent to those of ordinary skill in the art upon a reading of the following detailed description of presently preferred, but nonetheless illustrative, embodiments of the present invention when taken in conjunction with the accompanying drawings. The invention is capable of other embodiments and of being practiced and carried out in various ways. Also, it is to be understood that the phraseology and terminology employed herein are for the purpose of descriptions and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

For a better understanding of the invention, its operating advantages and the specific objects attained by its uses, reference should be had to the accompanying drawings and descriptive matter in which there are illustrated embodiments of the invention.

BRIEF DESCRIPTION OF THE DRAWINGS

The following drawings illustrate by way of example and are included to provide further understanding of the invention for the purpose of illustrative discussion of the embodiments of the invention. No attempt is made to show structural details of the embodiments in more detail than is necessary for a fundamental understanding of the invention, the description taken with the drawings making apparent to those skilled in the art how the several forms of the invention may be embodied in practice. Identical reference numerals do not necessarily indicate an identical structure. Rather, the same reference numeral may be used to indicate a similar feature of a feature with similar functionality. In the drawings.

DETAILED DESCRIPTION OF THE INVENTION

Figure 1:
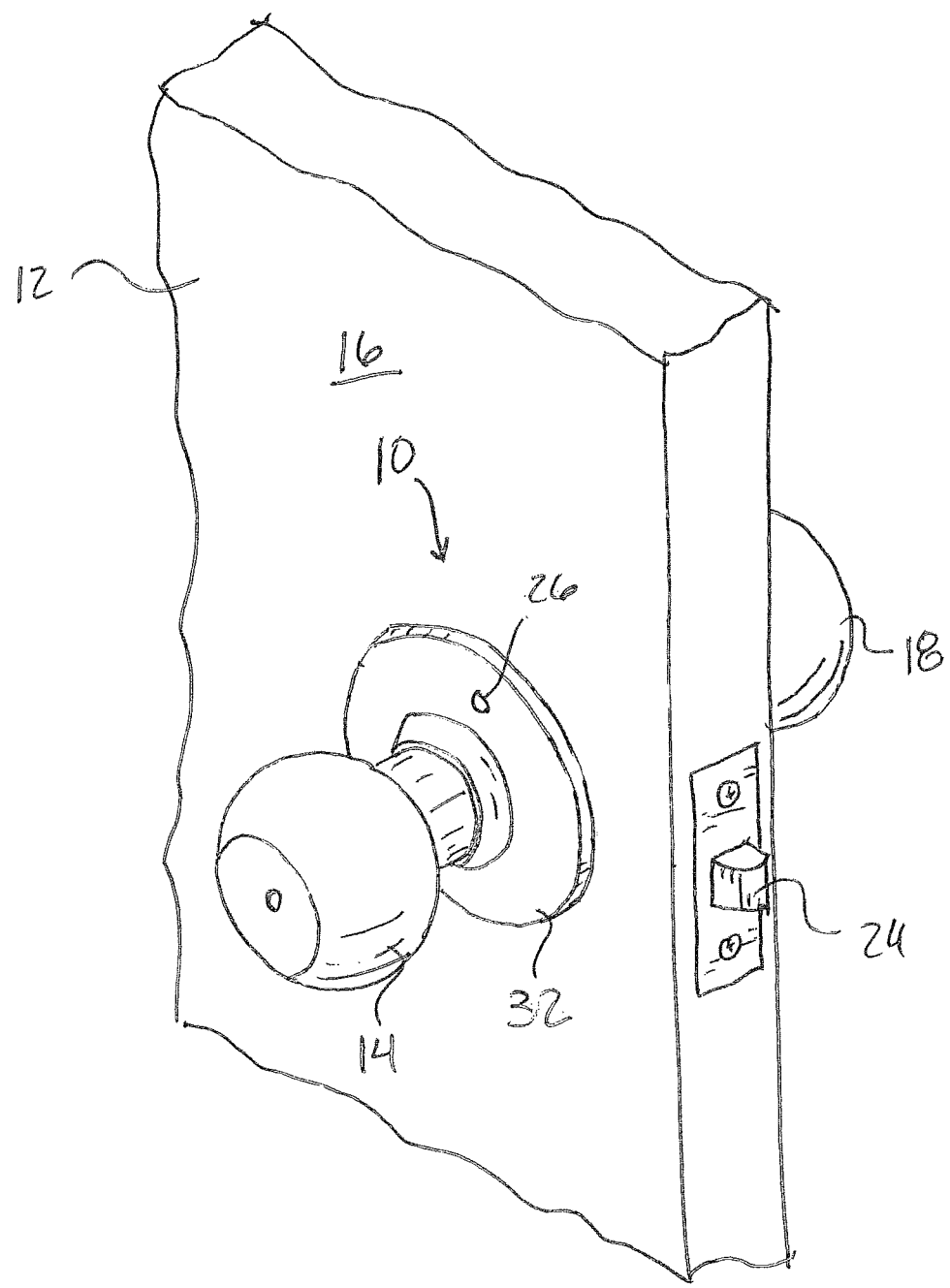
FIG. 1 is a prospective view of a doorknob indicator system constructed in accordance with the principles of an embodiment of the invention, showing the system on an exterior portion of a door.
Figure 2:
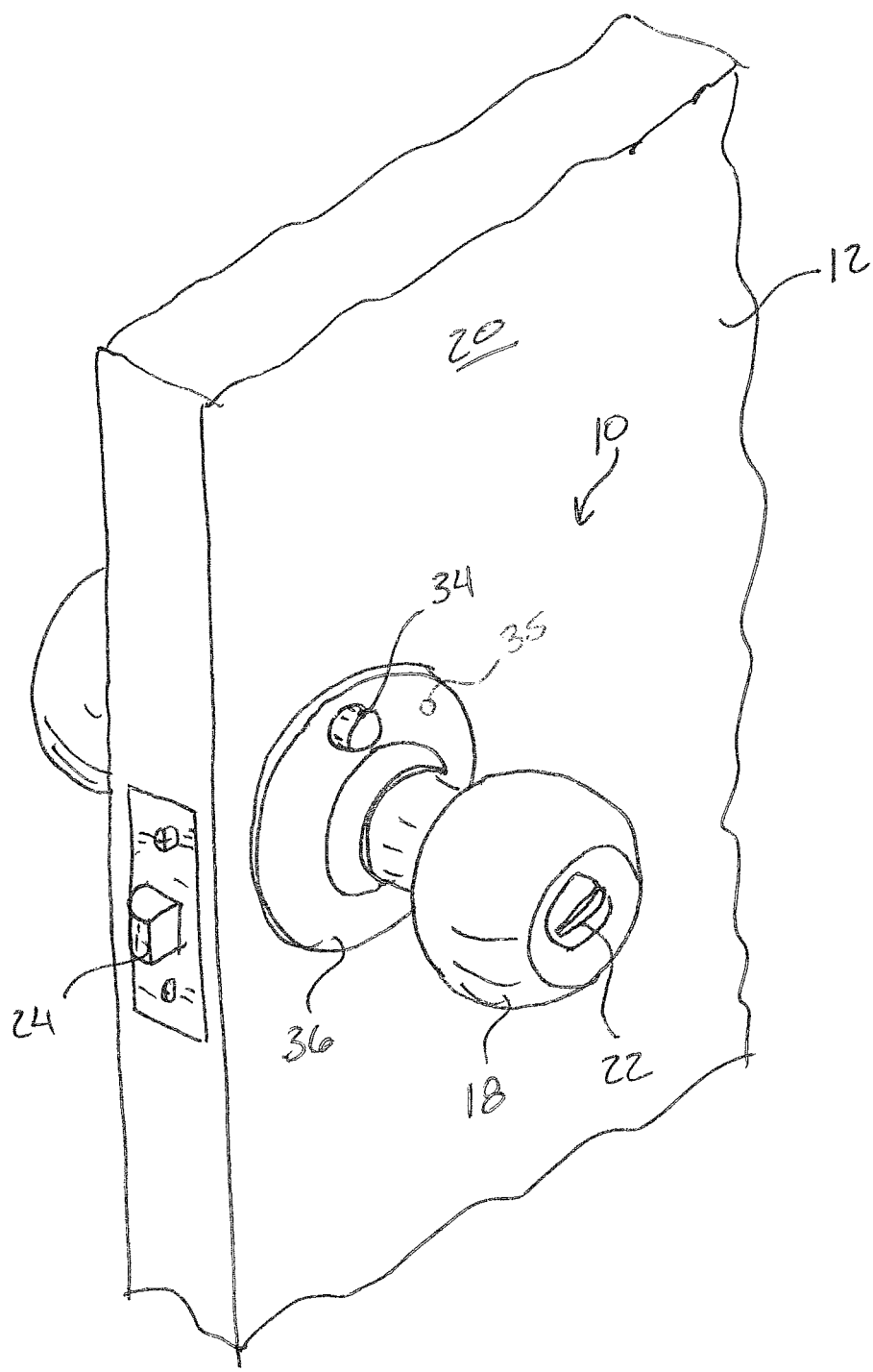
FIG. 2 is a prospective view of a doorknob indicator system constructed in accordance with the principles of an embodiment of the invention, showing the system on an interior portion of a door.
Figure 3:
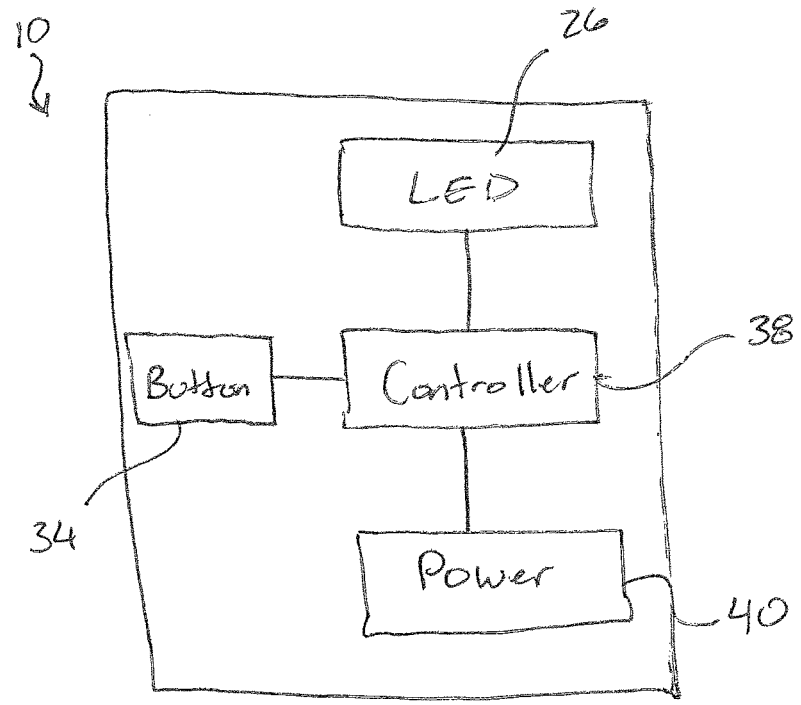
FIG. 3 is a block diagram of a doorknob indicator system constructed in accordance with the principles of an embodiment of the invention.

With reference to FIGS. 1 to 3, there is representatively illustrated a doorknob indicating system 10 according to an embodiment of the invention. System 10 includes an exterior knob 14 located on the exterior side 16 of the door 12 and an interior knob 18 located on the interior side 20 of the door. Conventionally, a lock 22 that is located on the interior knob 18 is selectable to lock or unlock latch 24.

A status indicator in the form of an LED light 26 is located on the escutcheon 32 of the exterior knob 14 so as to be seen by a person approaching the door 12. A user interface 34, representatively shown as a button, is located on the escutcheon 36 of the interior knob 18 so as to be accessed by a user of the system 10. The LED light 26, the button 34, and source of electrical power 40 (e.g., battery, solar, etc.) are operatively connected to controller 38, such as a PLC or the like. In the representatively illustrated embodiment, a person desiring to notify others that the restroom was previously used and may contain offensive odors would press the button 34 causing the controller 38 to operatively illuminate the LED 26 for a predetermined time period, such as, for example 15 minutes. Thus while the LED 26 is illuminated, a person from outside the door 12 would be alerted that the restroom was just used and may have offensive odor.

Alternative embodiments are possible. For example, different pre-set time periods could be selected by pressing the button more than once. In such an example, time periods could be stacked in five minute intervals (e.g., 5, 10, and 15 minutes) depending on the number of times the button is pressed. In other embodiments, duration of one or more time periods may be customized by the user. Further yet, the LED 26 could be a multi-color LED that could illuminate red and then green after the time expired, for example. Alternatively, the LED 26 could illuminate red for a time interval, then orange for a second time interval, then yellow for a third time interval, and then green after the time expires. In further embodiments, multiple LEDs could be used, each having a different color and being illuminated during a particular time interval. In yet further embodiment, the user interface may include more than one button and may also include a status indicator 35 to the user.

Figure 4:
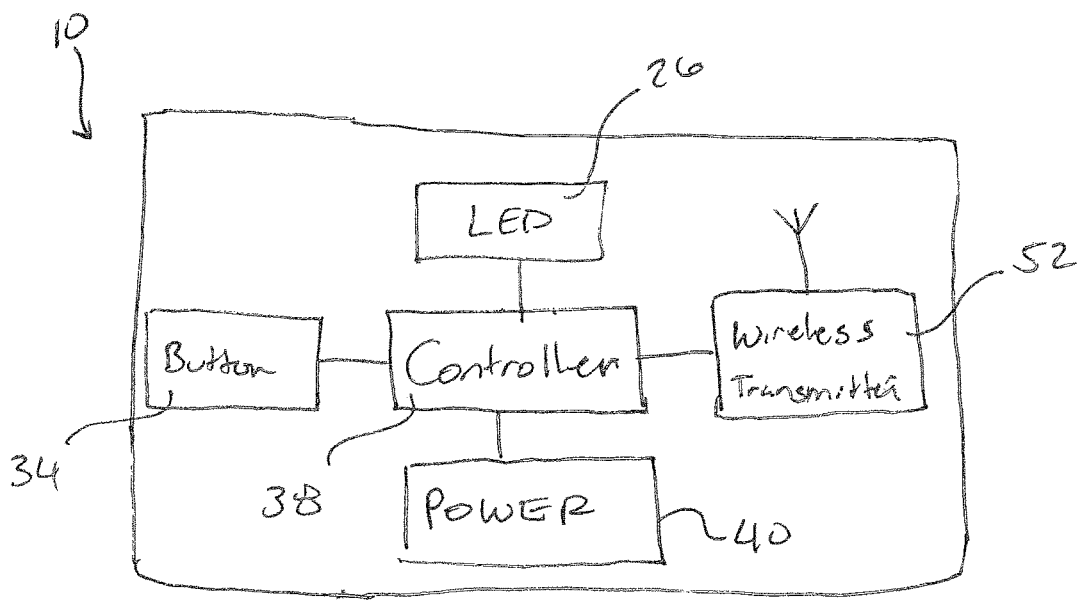
FIG. 4 is a block diagram of an alternative doorknob indicator system constructed in accordance with the principles of an embodiment of the invention.
Figure 5:
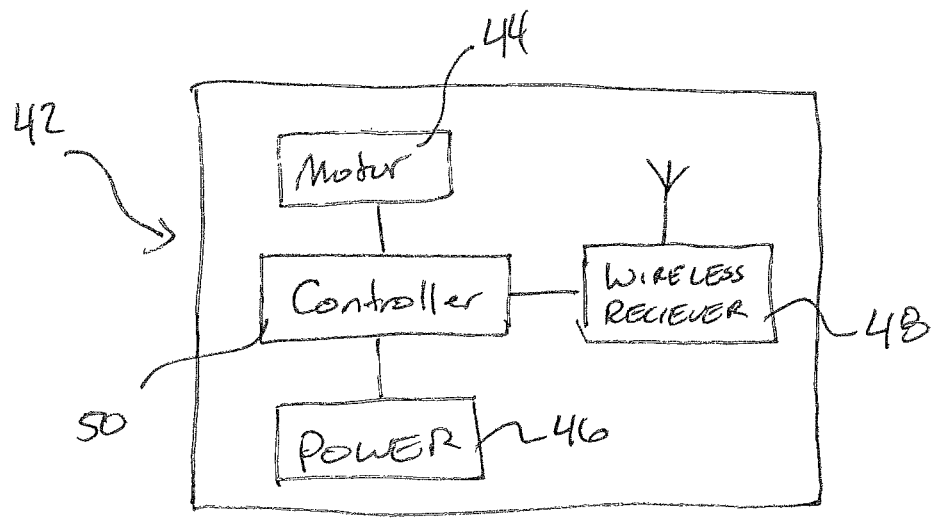
FIG. 5 is a block diagram of an exhaust fan used in conjunction with the doorknob indicator system constructed in accordance with the principles of an embodiment of the invention.
Figure 6:
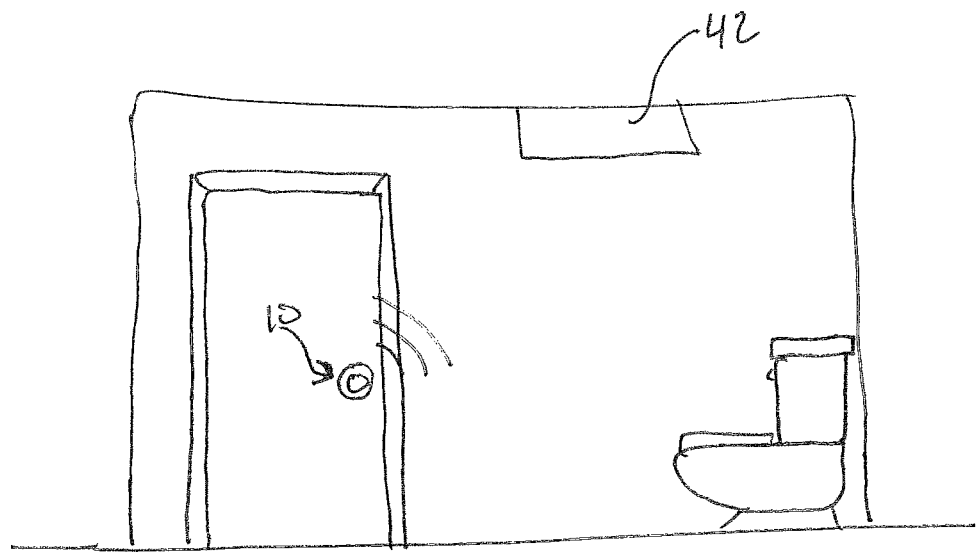
FIG. 6 is a diagrammatic view of the exhaust fan and doorknob indicator system.

With reference to FIGS. 4 to 6, the system 10 can also be configured to operate an exhaust fan 42. The exhaust fan motor 44, power 46, and wireless transceiver 48 are operatively connected to a controller 50. And a wireless transceiver 52 is operatively connected to controller 38. In this embodiment, controller 38 operates to send a wireless signal via transceiver 52 to controller 50 via transceiver 48 to turn the fan motor 44 on at the start of a time interval and then again to turn the fan motor off when the time interval expires. In other words, the exhaust fan 42 would be wirelessly controlled such that the fan is turned on upon activating a time interval and then turned off at the expiration of the time interval. For instance, if a user selected a five minute interval, the exhaust fan would operate during that five minute period.

Figure 7:
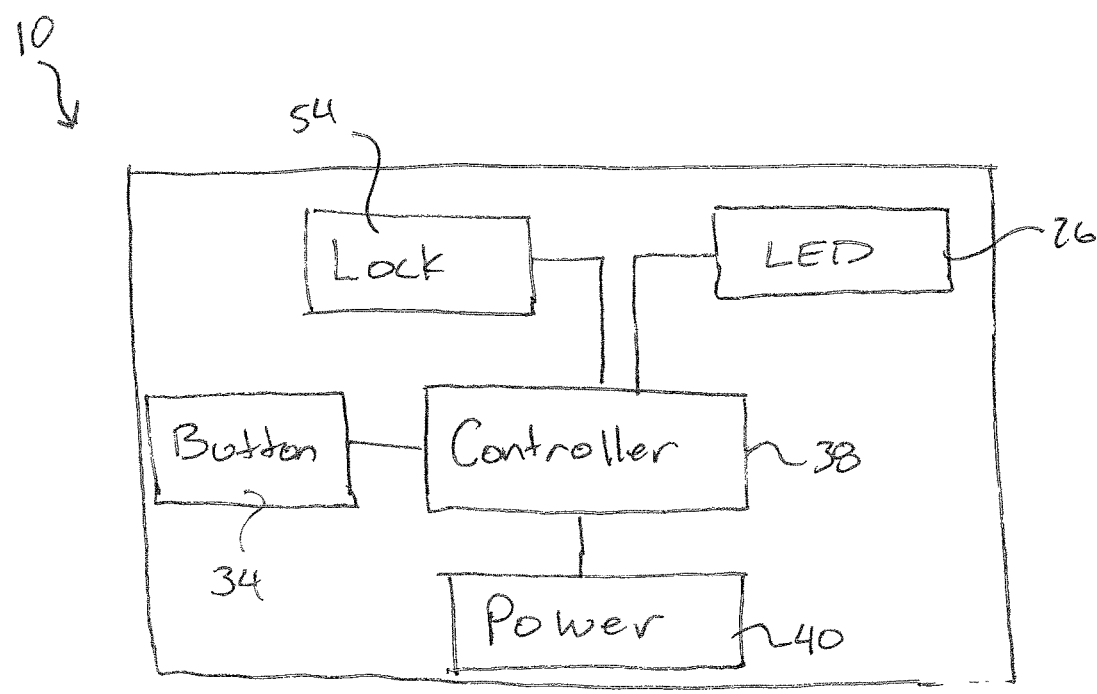
FIG. 7 is a block diagram of an alternative doorknob indicator system constructed in accordance with the principles of an embodiment of the invention.

With reference to FIG. 7, in another configuration, the door lock could be an electrically operated lock 54 that is operatively connected to the controller 38 to be locked and unlocked by the controller. For instance, in such a configuration, controller 38 could operate to control lock 54 to be in a locked state during the time interval and then operate to unlock the lock when the time interval expires. For instance, if a user selected a five minute interval, the lock 54 would be locked during that five minute period and then unlocked after the period expires. An example of an electrically operated lock that could be used is described by U.S. Pat. No. 8,689,594, the entirety of which is incorporated herein by reference.

It should further be noted that none of the embodiments described herein are mutually exclusive unless otherwise noted. For example, the embodiment described in connection with FIG. 7 can be combined with any other embodiment or embodiments described herein. Similarly, the embodiment described in connection with FIGS. 4 to 6 can also be combined with any other embodiment or embodiments described herein.

Further it should be noted that while the above description is made in connection with a restroom, it should be understood that the doorknob indicating system could be used in connection with a bedroom or other room to indicate that an occupant of the room requires privacy while the light is illuminated.

Further yet, while a number of embodiments of the present invention have been described, it will be understood that various modifications may be made without departing from the spirit and scope of the invention.

What is claimed is:

1. A doorknob indicating system for visually indicating a status of a room, the doorknob indicating system comprising:
   an interior doorknob disposed on an interior side of a door;
   an exterior doorknob disposed on an exterior side of the door;
   an LED on an escutcheon of said exterior doorknob;
   a user interface on an escutcheon of said interior doorknob;
   an electrically operated lock;
   a first source of electrical power;
   a first wireless transceiver;
   a first controller, said LED, said user interface, said electrically operated lock, said source of electrical power, and said first wireless transceiver operatively connected to said first controller;
   an exhaust fan having a motor;
   a second source of electrical power;
   a second wireless transceiver;
   a second controller, said motor, said second source of electrical power, and said second wireless transceiver operatively connected to said second controller;

said first controller programmed to illuminate said LED for a determined time intervals based upon an input received by said user interface; and said first controller operating to send a wireless signal via said first wireless transceiver to said second controller via said second wireless transceiver to turn said motor on at the start of said time interval and then again to turn the fan motor off when the time interval expires, said first controller further operating to in response to the input received by said user interface place said electrically operated lock in a locked state during said time interval and in an unlocked state when said time interval expires.

2. The doorknob indicating system of claim 1, wherein said LED is a multi-color LED.

3. The doorknob of indicating system of claim 1, wherein said user interface is a button.

* * * * *